United States Patent [19]
Villar

[11] Patent Number: 5,335,995
[45] Date of Patent: Aug. 9, 1994

[54] RESILIENT SUPPORT FOR A RAILROAD WHEEL HEAT SENSOR

[75] Inventor: Luis F. Villar, Westbury, N.Y.

[73] Assignee: Servo Corporation of America, Hicksville, N.Y.

[21] Appl. No.: 93,172

[22] Filed: Jul. 16, 1993

[51] Int. Cl.⁵ ............................ G01K 1/14; G01K 3/08
[52] U.S. Cl. ........................................ 374/208; 374/130; 374/153; 248/634; 267/141.2; 464/93; 464/91; 464/180; 384/492
[58] Field of Search ................ 374/208, 153, 130; 248/632, 634, 635; 267/136, 141, 141.2; 464/83, 91, 180; 384/492

[56] References Cited

U.S. PATENT DOCUMENTS

| | | | |
|---|---|---|---|
| 2,393,071 | 1/1946 | Schaelchlin | 248/635 |
| 2,819,063 | 1/1958 | Neidhart | 267/141 |
| 3,396,925 | 8/1968 | Dickie et al. | 248/634 |
| 3,425,652 | 2/1969 | Leary | 248/632 |
| 3,863,881 | 2/1975 | Fletcher et al. | 248/634 |
| 4,308,728 | 1/1982 | Croset | 464/83 |
| 4,525,081 | 6/1985 | Myhre | 374/208 |
| 4,705,257 | 11/1987 | Leo et al. | 248/634 |
| 4,795,253 | 1/1989 | Sandridge et al. | 250/338.5 |
| 4,801,212 | 1/1989 | Imura | 374/130 |
| 4,867,574 | 9/1989 | Jenkofsky | 374/130 |
| 4,998,826 | 3/1991 | Wood et al. | 374/130 |
| 5,149,048 | 9/1992 | Morehouse et al. | 248/634 |
| 5,231,401 | 7/1993 | Kaman et al. | 250/332 |

FOREIGN PATENT DOCUMENTS

| | | | |
|---|---|---|---|
| 0221517 | 4/1985 | Fed. Rep. of Germany | 248/634 |
| 0485800 | 12/1954 | Italy | 464/83 |
| 0065739 | 5/1980 | Japan | 267/141 |
| 0680604 | 9/1992 | Switzerland | 464/83 |
| 0684199 | 9/1979 | U.S.S.R. | 464/83 |
| 0806809 | 12/1958 | United Kingdom | 267/141.2 |
| 1557832 | 12/1979 | United Kingdom | 464/83 |
| 2141519 | 12/1984 | United Kingdom | 248/634 |
| 8504749 | 10/1985 | World Int. Prop. O. | 248/632 |

*Primary Examiner*—Diego F. F. Gutierrez
*Attorney, Agent, or Firm*—Kane, Dalsimer, Sullivan, Kurucz, Levy, Eisele and Richard

[57] ABSTRACT

A detector for detecting hot wheels or bearings on a railroad car includes an infrared sensor supported within a detector by a sensor housing. Elastic balls are disposed in the housing to absorb shocks generated by a train passing the detector.

12 Claims, 1 Drawing Sheet

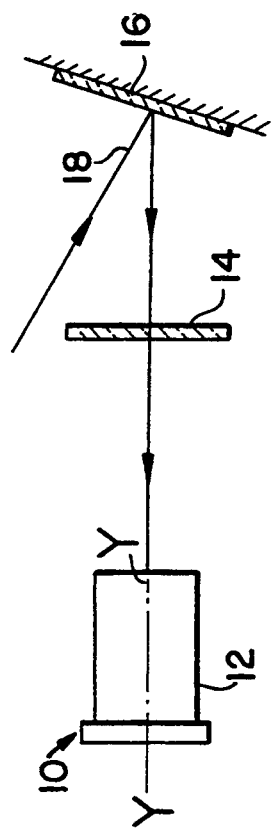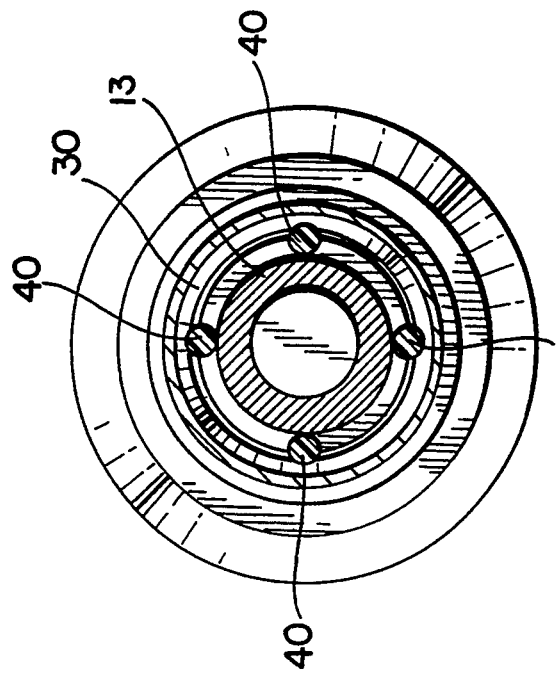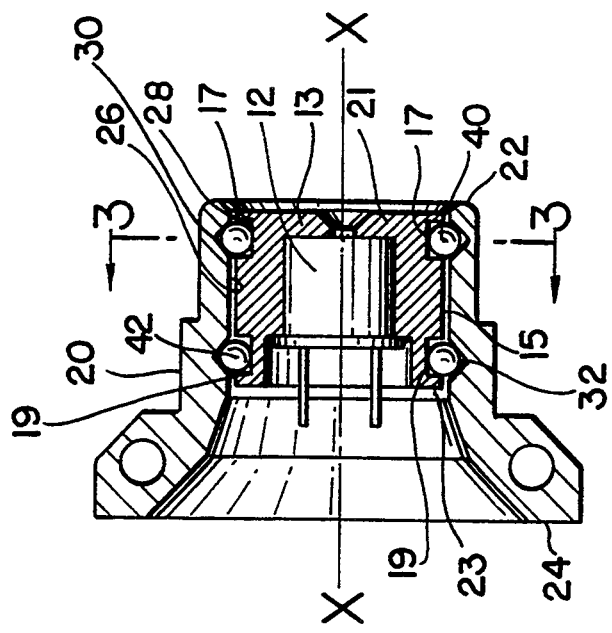

RESILIENT SUPPORT FOR A RAILROAD WHEEL HEAT SENSOR

BACKGROUND OF THE INVENTION

A. Field of Invention

This invention pertains to right of way sensors used for monitoring the temperatures of railroad cars, and more particularly to a support for heat sensors.

B. Description of the Prior Art

As railroad cars age, their wheels become prone to breakdowns due to overheated bearings or overheated rims caused by stuck brake shoes. Since the breakdown of car wheels can have very serious consequences, these wheels are monitored using wayside heat detectors disposed at regular intervals. These detectors are securely clamped to the rails and include temperatures sensors and sensitive for example to infrared radiation and optical means including an imaging lens for projecting an infrared image of a wheel bearing or rim onto the sensor as the car moves by the detector along the tracks. The sensor transforms the infrared image into electrical signal and sends them an electronic signal processor for analysis. Importantly, the sensor had to be protected from the damaging effect of vibration and shock generated by passing trains, which impaired the function of the heat detectors.

OBJECTIVES AND SUMMARY OF THE INVENTION

In view of the above-mentioned disadvantages, an objective of the present invention is to provide a support which protects a heat sensor from vibration and shock.

Another objective is to provide a heat sensor support which is relatively cheap and easy to make. Other objectives and advantages of the invention shall become apparent from the following description of the invention. Briefly, a heat detector constructed in accordance with this invention includes a housing with a substantially cylindrical bore for housing a heat sensor holder. The heat sensor holder is not resting directly in the bore but is supported therein by a plurality of elastic spherical members interposed between the heat sensor holder and the housing for eliminating the effect of shock and vibration. Because of the structure and operation of the detector, an expensive gel lens, used for imaging may now be replaced by a much cheaper plastic lens such as Fresnel lens.

BRIEF DESCRIPTION OF THE DRAWINGS

FIG. 1 shows schematically the components of a heat detector constructed in accordance with this invention;

FIG. 2 shows a side-sectional view of a sensor holder used in the detection of FIG. 1; and FIG. 3 shows a side-sectional view of the sensor and holder of FIG. 2.

DETAILED DESCRIPTION OF THE INVENTION

Referring now to the drawings, a heat sensor assembly 10 constructed in accordance with this invention includes a heat sensor 12, a lens 14 and a fold mirror 16. The image of a wheel is received by mirror 16 along path 18 and directed to sensor 12 through lens 14. Because the sensor is protected from shocks, instead of an expensive lens, lens 14 can be a relatively inexpensive Fresnel plastic lens.

Heat sensor 12 is mounted in a cylindrical holder 13 which is disposed in an external housing 20 as shown in more detail in FIG. 2. Housing 20 is substantially cylindrical and has a front end portion 22 and a rear end 24. The housing 20 also has an internal cylindrical bore 26 with a longitudinal axis X—X coincident with the optical axis Y—Y of sensor 12 as it receives the image of wheel along path 18 as shown in FIG. 1. Near its front end 28, bore 26 is formed with a circumferential groove 30, having for example a triangular cross-section. A second circumferential groove 32 is also provided in bore 26 axially spaced from and having the same shape and dimensions as groove 30.

Heat sensor 12 is an infrared sensor which generates electrical signals indicative of the intensity of infrared waves received by the sensor. As shown in FIG. 2, typically, heat sensor holder 13 has an outer surface 15 featuring two circumferential rows of cylindrical cavities 17, 19 having equal depths and separation. One row of cavities 17 is disposed near a front end 21 of holder 13 while the other row of cavities 19 is disposed near the rear end 23 of holder 13. The axial spacing of grooves 30, 32 in bore 26 is equal to the spacing between the two rows of cavities.

Importantly, the outside diameter of sensor holder 13 is somewhat smaller than the inner diameter of bore 26. Sensor holder 13 is maintained in and supported rotatably concentrically with respect to said housing about said optical axis and the longitudinal axis of bore 26. More specifically the sensor holder 13 is maintained co-axially and concentrically within bore 26 by two sets of resilient balls 40, 42. Each ball 40, 42, said balls being disposed about the holder 13, is nested between a cavity 17, 19 and a corresponding groove 30, 32. Balls 40 are journaled in groove 30 while balls 42 are journaled in groove 32. As shown in FIG. 3 each set of balls 40, 42 may consist of four balls disposed equidistantly around sensor holder 13 for gimballing said sensor holder within said housing 20. Obviously more or less balls (but no less than three) may be used for each set. Balls 40, 42 may be made from synthetic rubber or similar material.

Once the sensor 12 is inserted into holder 13, the holder and the sensor may be directly mounted inside a detector casing (not shown) together with the other components shown in FIG. 1 which is then installed on a railroad right of way. It has been found that the heat sensor performance is maintained when the detector is subjected to shock and vibration caused by passing trains. This unchanged performance is due specifically to the arrangement disclosed herein.

Obviously numerous modifications can be made to this invention without departing form its scope as defined in the appended claims and vibration caused by the passing trains. This undergraded performance due specifically to the arrangement and use of elastic balls as presented herein.

I claim:

1. A railroad wheel temperature detector for sensing the temperature of railroad wheels on a railroad right of way, said detector comprising;
    a heat sensor oriented to monitor the wheels of passing cars along an optical axis;
    a sensor housing having a bore surrounding said heat sensor; and
    elastic means disposed about said heat sensor for rotatably supporting said sensor within said housing, with said sensor being rotatable with respect to said housing about said optical axis to eliminate the effects of vibrations.

2. The detector of claim 1 wherein said sensor is an infrared sensor, said detector further comprising directing means for directing infrared waves from said wheels to said sensor.

3. The detector of claim 1 wherein said elastic means includes grooves provided in said housing and a plurality of resilient balls journaled in said grooves.

4. An infrared detector for monitoring the temperature of railroad car wheels comprising:
a housing having a cylindrical bore;
an infrared sensor constructed and arranged to convert infrared waves received along an optical axis from wheels of a railroad car into electrical signals, said sensor being disposed in said bore;
a sensor holder holding said infrared sensor; and
elastic support means constructed and arranged to rotatably support said holder within said bore, said holder being rotatable concentrically around said optical axis to eliminate the effects of vibrations.

5. The detector of claim 4 wherein said bore is formed with at least one circumferential groove and said elastic support means includes a plurality of balls journaled within said groove to support said sensor.

6. The detector of claim 5 wherein said bore has a longitudinal axis and said sensor is maintained in a concentric position with respect to said axis by said balls.

7. The detector of claim 5 wherein said balls are made of a resilient material.

8. The detector of claim 4 wherein said holder is cylindrical and said elastic support means are disposed about the cylindrical holder.

9. A railroad car wheel temperature detector comprising:
a housing having a bore with a longitudinal axis, said bore having a first and a second axially spaced circumferential grooves;
an infrared sensor arranged and constructed to receive infrared waves from said wheels along an optical axis coincident with said longitudinal axis and to generate corresponding electrical signals;
a sensor holder disposed in said bore for holding said sensor; and
resilient ball means disposed in said grooves about said sensor holder for rotatably supporting said holder within said housing and for eliminating the effects of vibrations, said holder being rotatable about said axis.

10. The detector of claim 9 wherein said ball means includes a first and a second set of balls.

11. The detector of claim 10 wherein said holder has a first and a second end and said first and second set of balls are disposed adjacent to said first and second ends respectively.

12. The detector of claim 11 wherein said holder is cylindrical and has a first set and a second set of cavities disposed adjacent to said first and second ends respectively, each ball of said first and second sets of balls being nested in one of said said first and said second set of cavities.

* * * * *